3,231,551
PROCESS FOR POLYMERIZING CYCLIC OXIDES WITH A CATALYST COMPRISING AN ORGANO-METALLIC COMPOUND AND AN ORGANIC OR INORGANIC COMPOUND OF THE FORMULA $R(AH)_x$
Robert J. Herold, Robert J. Belner, and Marco A. Achon, Akron, Ohio, assignors to The General Tire & Rubber Company, Akron, Ohio, a corporation of Ohio
No Drawing. Filed June 1, 1960, Ser. No. 43,263
13 Claims. (Cl. 260—88.3)

This invention relates to a method of polymerizing cyclic oxides using certain catalysts. More particularly, it relates to a method of polymerizing cyclic oxides with catalysts of organic and inorganic sulfur groups elements and organic compounds of aluminum, beryllium, cadmium, gallium and zinc, to the catalysts used in such method, and to methods of making said catalysts, as well as to the polymers produced.

It is an object of the present invention to provide a method for polymerizing cyclic oxides using catalysts obtained from organic and inorganic sulfur group elements in conjunction with organic compounds of aluminum, beryllium, cadmium, gallium and zinc, and to the polymers so obtained.

Another object is to provide a method of making these catalysts materials.

Still another object is to provide catalyst compositions useful in catalyzing the polymerization of cyclic oxides.

These and other objects and advantages of the present invention will become more apparent to those skilled in the art from the following detailed description and examples.

According to the present invention, it has been discovered that cyclic oxides can readily be polymerized to a high molecular weight as evidenced by their high intrinsic viscosities by conducting the polymerization in the presence of a catalyst resulting from the addition to the monomer in minor amounts of (I) a sulfur, selenium and/or tellurium inorganic or organic compound and (II) an organic aluminum, beryllium, cadmium, gallium and/or zinc compound or the reaction product of (I) and (II).

The sulfur type compound has the general formula $R(AH)_x$. In this formula H is hydrogen, R is hydrogen or an organic compound attached to A through a carbon atom and more preferably is an aliphatic, aromatic or aliphatic cyclic hydrocarbon radical of up to 14 carbon atoms, preferably of from 1 to 9 carbon atoms. A is sulfur, selenium or tellurium having a valence of two and $x$ is one or two, preferably $x$ is one.

Examples of useful sulfur type compounds are as follows: hydrogen sulfide, hydrogen selenide, hydrogen telluride, methyl mercaptan or methane thiol, ethyl mercaptan, n-butyl mercaptan, n-propyl mercaptan, isopropyl marcaptan, isobutyl mercaptan, tert-butyl mercaptan, allyl mercaptan, 1-heptane thiol, hexyl mercaptan, octyl mercaptan, n-decyl mercaptan, lauryl (dodecyl) mercaptan, tert-dodecyl mercaptan, hexadecyl mercaptan, octadecyl mercaptan, 2 - mercaptobenzothiazole, 2 - methyl mercaptobenzothiazole, phenyl mercaptan, benzyl mercaptan, 2-methyl-2-butanethiol, amyl mercaptan, isoamylmercaptan, o-mercaptobenzoic acid, thio benzoic acid, furfuryl mercaptan, monothioglycol, monothioglycolic acid, cyclohexyl mercaptan, methyl cyclohexylene mercaptan, cyclohexyl methylene mercaptan, phenyl cyclobutylene mercaptan, monothio - 1,4 - hydroquinone, alpha - naphthyl mercaptan, beta-naphthyl mercaptan, 1-thioglyceral, thiocyanic acid, thiolacetic acid, 1-cysteine, orthoamino thiophenol, 1,2-ethane dithiol, dithiohydroquinone, dithioresorcinol, o-thiocresol (o-tolyl mercaptan), p-thiocresol, m-thiocresol, propylselenomercaptan (propanselenol - 1), seleno - phenol, cyclobutylselenomercaptan, methylselenomercaptan, cyclohexyl phenylene selenomercaptan, tolylcyclopropyl selenomercaptan, isopropylselenomercaptan, allylselenomercaptan, hexylselenomercaptan, octyl selenomercaptan, tolyl selenomercaptan, benzyl selenomercaptan, seleno - o - benzoic acid, ethyl telluro mercaptan ($C_2H_6TeH$), butyl telluromercaptan, amyltelluro mercaptan, cycloheptyl telluromercaptan, cyclohexyl benzylene telluromercaptan, phenyltelluromercaptan, dodecyl telluromercaptan, tolyl telluromercaptan, ditelluro resorcinol and alpha-naphthyl telluromercaptan and the like.

Mixtures of these sulfur, selenium and tellurium compounds can be used. It is preferable to use hydrogen sulfide and the alkyl, alkaryl, aralkyl, or aryl mercaptans. These compounds can readily be made by methods known to those skilled in the art.

The second component of the catalyst system which is added to the monomer or which may be mixed with the sulfur type compound has the formula $BR'_y$ where B is selected from the group consisting of aluminum, beryllium, cadmium, gallium and zinc and R' is an aliphatic, aromatic or cycloaliphatic hydrocarbon radical, preferably an alkyl, aryl, alkaryl or aralkyl radical, of up to 14 carbon atoms which may be the same or different. Preferably, R' has from 1 to 9 carbon atoms, and $y$ is equal to the valence of B.

Examples of useful organo-metallic compounds falling with the scope of the above-identified formula are triethyl aluminum, trimethyl aluminum, triphenyl aluminum, tributyl aluminum, trihexyl aluminum, trinonyl aluminum, tripentyl aluminum, trioctyl aluminum, tritolyl aluminum, diphenylmethyl aluminum, tricyclobutyl aluminum, tri-(trimethyl cyclohexyl) aluminum, methyl diethyl aluminum, triisobutyl aluminum, dimethyl beryllium, diethyl beryllium, dipropyl beryllium, di-n-butyl beryllium, methyl phenyl beryllium, amyl phenyl beryllium, diphenyl beryllium, dicyclohexyl beryllium, ditolyl beryllium, dibenzyl beryllium, methyl cyclohexyl beryllium, phenyl cyclohexyl beryllium, dioctyl beryllium, di(cyclohexylmethylene) beryllium, dibutyl cadmium, diethyl cadmium, diisoamyl cadmium, diisobutyl cadmium, dimethyl cadmium, dipropyl cadmium, dihexyl cadmium, diheptyl cadmium, dioctadecyl cadmium, dilauryl cadmium, dialpha-naphthyl cadmium, benzylphenyl cadmium, dibenzyl cadmium, ethyl propyl cadmium, di-(phenyl cyclobutylene) cadmium, di(cyclohexyl phenylene) cadmium, tolyl methyl cadmium, triethyl gallium, trimethyl gallium, triphenyl gallium, tripropyl gallium, diphenyl methyl gallium, dimethyl phenyl gallium triheptyl gallium, tricyclohexyl gallium, tri(tolyl cyclopropyl) gallium, trihexyl gallium, tricycloheptyl gallium, dimethyl zinc, diethyl zinc, dibutyl zinc, diisobutyl zinc, diphenyl zinc, di-n-propyl zinc, di-o-tolyl zinc, diisopropyl zinc, di-p-tolyl zinc, dibenzyl zinc, methylethyl zinc, dicyclohexyl zinc, dinaphthyl zinc, methyl phenyl zinc, diheptyl zinc, didodecyl zinc, dioctadecyl zinc, diphenylbutylene zinc, butyl methyl zinc, dicyclohexyl zinc, di(cyclohexyl benzylene) zinc, and dicyclopentyl zinc and the like.

Mixtures of these organic aluminum, beryllium, cadmium, gallium and zinc compounds can be used. Of these compounds, it is preferred to use the zinc compounds. Some of these compounds may spontaneously ignite and should be kept under an inert atmosphere or in an inert solvent until used and should be added to the monomer carefully. These compounds can readily be prepared by methods known to the art.

The molar ratio of the sulfur type compound to the metal-organic can vary substantially. However, in general, from about 0.05 to 2.5 mols of the sulfur type compound can be used with 1 mol of the metal organic type compound. Preferably, from about 0.8 to 1.5 mols of the sulfur type compound is used for each mol of the metal-organic type compound. These materials can be mixed together and added to the monomer and/or to the solvent. Alternatively, the sulfur compound can be added to the solvent or monomer-solvent mixture and then the metal-organic can be added.

Further, the sulfur type compound and the metal organic compound can be reacted together and the reaction product used to polymerize the cyclic oxides. The reaction can readily be conducted by bringing the materials together in an inert organic non polar solvent such as heptane, octane, benzene, toluene and so forth or under reflux. Temperatures of from about 30 to 250° C. can be used to facilitate the reaction. Reaction can also be conducted under an inert atmosphere. Still other ways of reacting these materials can be conducted.

It is not precisely known what occurs during the polymerization reaction. The sulfur type compound may be promoting or catalyzing the action of the metal organic type compound or vice versa. On the other hand, these compounds may form novel complexes or reaction products in the monomer or monomer-solvent system which cause polymerization to occur. However, whatever may be the true explanation, it has been found that the addition of both of these materials to a cyclic oxide is necessary to cause polymerization of the same.

The cyclic oxides to be polymerized include any cyclic oxide having 1, 2, 3 or more oxygen-carbon rings in which the oxygen atom is joined with 2 to 3 carbon atoms in the ring which will open and polymerize with the same or other cyclic oxide monomers. These monomers, also, may contain 1, 2, or more, preferably only 1, aliphatic carbon-to-carbon double bond. The halogen, nitro, ether and ester substituted derivatives of these cyclic oxides can likewise be employed. The use of monomer mixtures having cyclic oxide monomers containing aliphatic carbon-to-carbon double bond unsaturation in an amount of from about 0.5 to 15 mol percent, the balance being the saturated cyclic oxide monomer, permits the resulting copolymer to be cured readily with materials such as sulfur and the like. A very useful mixture is one containing propylene or butylene oxide in an amount of 95 to 99.5 mol percent and allyl glycidyl ether or butadiene monoxide in an amount of 5 to 0.5 mol percent to obtain a crosslinkable (by sulfur) copolymer.

Examples of useful cyclic oxides are oxirane oxirene, ethylene oxide, propylene oxide, butene monoxide, dodecene monoxide, isobutylene monoxide, styrene oxide, 1,2-diisobutylene oxide, 2,3-diisobutylene oxide, phenyl glycidyl ether, allyl glycidyl ether, methyl glycidyl ether, ethyl glycidyl ether, vinyl cyclohexene monoxide, nitro ethylene oxide, butadiene dioxide, 3-methyl-3,4-epoxy butene-1, butadiene monoxide, vinyl cyclohexene dioxide, glycidyl methacrylate, epichlorohydrin, dicyclopentadiene monoxide, limonene dioxide, isoprene monoxide, oxetane ($C_3H_7O$), diglycidyl ether of pentanediol, bis 1,1'-(3,4-epoxy-6-methyl phenyl) methyl formate, the reaction product of the diglycidyl ether of pentanediol and bisphenol A, 3,3-dimethyl oxetane, 1-epoxy ethyl-3,4-epoxy cyclohexane, 3,3-diethyl oxetane, 3-ethyl-3-butyl oxetane, 3,3-di(chloromethyl) oxetane, 3-chloro-methyl-3-methyl oxetane, 3-methyl-2-ethyl oxetane, 1,4-dichloro-2,3-epoxy butane, allyl epoxy stearate, the reaction product of the diglycidyl ether of pentane diol and a polyalkylene or arylene ether glycol and other cyclic oxides. Mixtures of these cyclic oxides can be used. Of these materials it is preferred to use the lower molecular weight cyclic oxides such as ethylene oxide, propylene oxide, butylene oxide etc. with minor amounts of unsaturated cyclic oxides such as allyl glycidyl ether, butadiene monoxide and vinyl cyclohexane monoxide.

Where the cyclic oxide monomer contains 2 or more epoxide, oxetane and similar groups, it may readily crosslink or gel in the presence of the catalyst mixture to form a resinous rather than a rubbery material. Such materials are very useful in forming potting compounds for delicate electrical and mechanical instruments. Those compounds which have no ethylene unsaturation may be cured with mixtures of organic peroxides and sulfur or other curing agents.

The catalyst is used in a minor molar amount only sufficient to catalyze the reaction. Large amounts are usually wasteful and may in time cause reversion or subsequent decomposition of the polymer. In general, there is used a total of from about 0.01 to 10 moles of the catalysts based on 100 moles of the monomer or monomers being polymerized. However, it is preferred to use a total of from about 0.1 to 3.5 moles of the catalysts based on 100 moles of the monomer(s).

The monomers may be polymerized with the catalysts in mass or in solvent. They, also, should be polymerized under inert or nonoxidizing conditions, for example, under an atmosphere of nitrogen, argon, neon, helium or other inert or non-oxidizing atmosphere. It is sometimes desirable to polymerize in a solvent since this facilitates handling and operation. Alternatively, the inert gas can be omitted and the monomer polymerized in the solvent only under pressure from any vaporized solvent or gaseous monomer. The monomer should be soluble in the solvent which should be an inert or non-reactive solvent. Examples of useful solvents are heptane, octane, cyclohexane, toluene, benzene, trimethylpentane, carbon tetrachloride, chloroform, diethyl ether, trichloroethylene etc. It is preferred to use non-polar hydrocarbon solvents. Since most of the reactants are volatile, it is preferred to conduct the polymerization in a closed container under pressure. Polymerization can be conducted at temperatures above 25° C., preferably from about 40 to 150° C. If the polymer dissolves in the solvent, it can be precipitated with a non-solvent and recovered, or the solvent can be separated from the polymer. The catalyst or catalyst residues can be removed if desired by centrifuging a solution of the polymer. If it is desired to destroy or kill the catalyst, the polymer may be treated with water, alcohol solutions or dilute solutions of acids and the like. Alkaline materials may be used to neutralize the catalyst. The removal of the catalyst will depend upon the ultimate use of the polymer.

Since the reaction is exothermic and since some monomers may react very rapidly, it may be desirable to reduce the concentration of the catalyst and cocatalyst or to vary the ratio of the sulfur type catalyst to the metal-organic type catalyst to cause the polymerization to proceed at a lower rate. Alternatively, the amounts and ratios of the catalysts can be changed to speed up the amount and rate of conversion or polymerization.

In the event that any gel forms and where it is not desired to have gel or a crosslinked polymer but rather a rubbery or liquid polymer, inhibitors may be added. Examples of useful inhibitors are nitrobenzene, dinitrotoluene, dinitrodiphenyl, nitrodiphenyl amine, chloronitrobenzene and so forth. In some instances gel formation may be avoided by polymerizing in the dark. Antioxidants such as phenyl beta naphthylamine, also, are desirably added prior to or during polymerization.

Many of the polymers obtained by the method of the present invention have a high average molecular weight i.e., from about 50,000 to 500,000 or higher as shown by their high intrinsic viscosities of from about 1 to 8. They may be crystalline and/or amorphous. These polymers are useful as coatings for fabrics, films for packing materials, elastic fibers, adhesives, and in making tires, shoe heels, raincoats, and upholstery materials, floor mats, molded articles and the like. Liquid polymers of this invention are useful as plasticizers for natural and synthetic resins.

The polymers may be compounded with the usual rubber and resinous compounding materials, such as curing agents, antidegradants, fillers, extenders, ultraviolet light absorbers, fire resistant materials, dyes, pigments, plasticizers, lubricants, other rubbers and resins and the like. Examples of useful materials which can be compounded with these rubbers, resins and polymers are zinc oxide, stearic acid, sulfur, 2-mercaptobenzothiazole, bis-(morpholyl) disulfide, bis(benzothiazyl) disulfide, zinc dimethyl dithiocarbamate, tetramethyl thiuram disulfide, carbon black, $TiO_2$, iron oxide, calcium oxide, $SiO_2$ and $SiO_2$ containing materials, aluminum oxide, phthalocyanine blue or green, asbestos, mica, wood flour, nylon or cellulose fibers or flock, clay, barytes, dioctyl phthalate, tricresyl phosphate, non-migrating polyester plasticizers, phenyl beta naphthylamine, pine oil, mineral oil, hydroquinone monobenzyl ether, mixtures of octylated diphenylamines, styrenated phenols, aldol alpha naphthylamine, diphenyl amine acetone reaction products, antimony oxide, asphalt, coumarone indene resin, natural rubber, polyisoprene, butadiene-styrene rubber or resin, nitrile rubber, acrylonitrile-styrene resin, polyester and/or ether urethanes, polyvinyl chloride and the like and mixtures thereof.

The following examples will serve to illustrate the invention with more particularity to those skilled in the art:

Example I

Into a pressure reactor was charged 100 mols of normal heptane as a solvent. Hydrogen sulfide was passed into the solvent to provide a concentration of 1.0 mol percent; 100 mols of propylene oxide were then charged to the heptane solution. Next 1.0 mol percent of zinc diethyl was added to the mixture. A dense white colloid formed instantaneously upon adding the $ZnEt_2$ to the solution of $H_2S$ in the propylene oxide solution. The particles of this colloid were still perfectly suspended after a full day at room temperature (before polymerization started). Following polymerization, this dense whiteness (from the catalysts) was uniformly suspended in the solid polymer. Polymerization was effected under a nitrogen atmosphere at a temperature of about 80° C. After polymerization (65% yield), the solution was treated with acetone at room temperature to precipitate a crystalline fraction which was found to have an intrinsic viscosity of 7.0 in benzene at a temperature of 25° C. This was very high for a polypropylene oxide. The amorphous fraction of the polymer was very sticky.

When the method of Example I above, was repeated in several instances except that hydrogen cyanide, ammonia or carbon dioxide was used in place of the hydrogen sulfide, no polymer was obtained at extended periods of time at elevated temperatures. When zinc oxide or zinc sulfide was used in place of zinc diethyl, in the method of Example I, above, no polymer was obtained. These results show that it is necessary to employ particular sulfur type compounds and particular metal organic compounds.

Moreover, when zinc diethyl was used alone as a catalyst, only a slight change in viscosity of the solution was observed after a week at 80° C., whereas when hydrogen sulfide was used as the only catalyst, no change at all was apparent. This indicates that neither hydrogen sulfide or diethyl zinc are catalysts by themselves for cyclic oxides.

Example II

The method of this example was similar to that of Example I, above, except that the monomer comprised a mixture of 97 mol percent propylene oxide and 3% allyl glycidyl ether. The resulting copolymer was a rubbery material having an intrinsic viscosity of about 5.9. This rubbery material was then compounded in a rubber recipe as shown below and cured in a mold at 287° F. for 45 minutes. The results obtained disclosed that the vulcanized rubbery propylene oxide-allyl glycidyl ether copolymer had considerable strength.

| Formulation for copolymer: | Parts by weight |
|---|---|
| Gum rubber (PO-AGE copolymer) | 100 |
| Carbon black | 40 |
| PBNA (phenyl beta naphthylamine) | 1 |
| Stearic acid | 2 |
| Sulfur | 2 |
| Methyl tuads (tetra methyl thiuram disulfide) | 1 |
| Bis(benzothiazyl)disulfide (Altax) | 1 |
| Zinc oxide | 5 |

| Properties of cured copolymer: | Parts by weight |
|---|---|
| Tensile, p.s.i. | 1725 |
| 100% modulus, p.s.i. | 350 |
| 300% modulus, p.s.i. | 1075 |
| Elongation, percent at break | 510 |
| Tear (crescent) | 484 |

Still other polymerizations were conducted as shown in the following examples in which the propylene oxide employed was dried by leaving it over $Na_2SO_4$ for 24 hours and by distilling it over aluminum tri-isobutyl. The thiols used were dried by leaving them over $Na_2SO_4$ for 24 hours.

Example III

To 26.8 ml. of dry propylene oxide there were added 0.248 g. (0.004 mole) ethanethiol and 0.4 ml. (0.004 mole) $ZnEt_2$ (diethyl zinc). This was 1 mole percent $ZnEt_2$ on the monomer. The ratio $ZnEt_2$/thiol was 1/1. After heating the above prepared mixture for 24 hours at 80° C. under pure nitrogen, there was obtained, by dissolution of the contents of the polymerization bottle in acetone and pouring it into water, 16 g. of a white rubber product. The conversion was 73% and the inherent viscosity, in benzene at 25° C., of the obtained polymer was 6.54 (0.217 g. polymer/100 cc. $C_6H_6$).

Example IV

To 26.8 ml. of dry propylene oxide there were added 0.36 g. (0.004 mole) of butanethiol and 0.4 ml. $ZnEt_2$ (0.004 mole, 1 mole percent on the monomer). Ratio $ZnEt_2$/thiol was 1/1. After 24 hours at 80° C., the conversion was 65%. The obtained rubbery polymer had an inherent viscosity in benzene of 6.8 (0.1974 g. polymer/100 cc. $C_6H_6$).

Example V

To 26.8 ml. of propylene oxide (0.4 mole) there were added 0.4 ml. thiophenol and 0.4 ml. $ZnEt_2$ (0.004 mole, 1% on the monomer). The liquid mixture was heated at 80° C. for 24 hours. The contents of the bottle were dissolved in acetone and poured into water. 7 g. (30% yield) of a white rubbery product with inherent viscosity in benzene of 3.67 (0.217 g. polymer/100 cc. $C_6H_6$) were obtained in this way.

Example VI

The method of this example was similar to the method of Examples III–V, above, except that the catalyst comprised 1 mol % of zinc diethyl and 1 mol % of ethane-1,2-dithiol. The polypropylene oxide obtained was an oil of light viscosity.

Example VII

The reaction product of $ZnEt_2$ and $HSC_4H_9$ was prepared and which proved to be soluble in heptane. The heptane solution containing this product was used as a catalyst for the polymerization of propylene oxide dried as described above.

Two heptane solutions were prepared:

A-solution, which contained 10.45 ml. (12.55 g., 0.1 mol) $ZnEt_2$(zinc diethyl) in 100 ml. heptane and B- solution which contained 10.5 ml. (9 g., 0.1 mol) butanethiol in 50 ml. heptane.

Both solutions were kept in capped bottles under nitrogen and at 0° C. The heptane was first dried by passing it through molecular sieves and later on it was distilled over aluminum triisobutyl. The butanethiol was dried over $Na_2SO_4$.

By pressurizing nitrogen into B, its contents were passed through needles and a fine rubber tube into A. The addition of B to A was done dropwise and took about two hours.

The final mixture of A and B was allowed to reach room temperature. No precipitate nor cloudiness was seen in the heptane, which contained the $ZnEt_2$ and the butanethiol. In order to complete the reaction between these products, the total heptane solution (A and B) was heated and samples of the liquid after 1, 2 and 8 hours heating at 80° C. were taken. All the samples of liquid were clear, no precipitates were seen.

The methods of the following examples were similar to those of Examples III–V, above.

Example VIII 50 ml. of the heptane solution containing 0.029 mol of $ZnEt_2$ and 0.029 mol of $HSC_4H_9$ after 1 hr. heating as described in Example VII, above, were used to polymerize 97.15 ml. of propylene oxide. There were 2 moles of the hypothetical complex $ZnEt_2+HSC_4H_9$ for every 100 moles of the propylene oxide monomer. After 18½ hours at 80° C., the conversion was 50% and the obtained polymer had an inherent viscosity of 7.35 in benzene (0.2048 g. polymer in 100 cc. benzene).

Example IX

A second sample of 50 ml. heptane solution taken after two hours of heating the heptane containing the $ZnEt_2$ and the thiol as described in Example VII, above, was mixed with 97.15 ml. of dry proylene oxide. The total mixture was heated at 80° C. for 18½ hours. The conversion was 50% and the obtained polymer had an inherent viscosity of 6.61 in benzene (0.2180 g. polymer in 100 cc. benzene).

Example X

The last part of the solution, about 70 ml., which was heated for 8 hours as shown in Example VII, above, was mixed with 101 ml. of dry propylene oxide. In this way the concentration of the hypothetical $ZnEt^2+HSC_4H_9$ complex was also 2 mole percent on the monomer, as in the two previous polymerizations. After 18½ hours at 80° C. the conversion was 46%, and the polymer had an inherent viscosity of 6.76 in benzene (0.1946 g. polymer in 100 cc. benzene).

The polymers of Examples VIII–X had a high amorphous content. Since the results of the polymerizations of Examples VIII–X are somewhat similar, it is apparent that it is not necessary to heat the catalyst components for a long period of time. It is noted that the reaction product of the metal organic and sulfur type compound produces polymers of high molecular weight.

It is to be understood that in accordance with the provisions of the patent statutes the particular compositions, products and methods described and set forth herein are presented for purposes of explanation and illustration and that various modifications of said compositions, products and methods can be made without departing from this invention.

What is claimed is:

1. The method which comprises, under non-oxidizing conditions, mixing at least one polymerizable cyclic oxide having from one to two rings of from 2 to 3 carbon atoms and one oxygen atom with a minor molar amount sufficient to catalyze the polymerization of said cyclic oxide of a catalyst and polymerizing said oxide in admixture with said catalyst to form a polyether, said catalyst being selected from the group consisting of (A) a mixture of and (B) the reaction product of (I) at least one compound having the general formula $R(AH)_x$ where H is hydrogen, and where R is selected from the group consisting of hydrogen, an aliphatic hydrocarbon radical, an aromatic hydrocarbon radical and a cycloaliphatic hydrocarbon radical, said radicals having from 1 to 14 carbon atoms, A is selected from the group consisting of sulfur, selenium and tellurium and has a valence of 2, and x is an integer of from 1 to 2, and (II) at least one compound having the formula $BR'_y$ where B is selected from the group consisting of aluminum, beryllium, cadmium, gallium, and zinc, y is equal to the valence of B, and R' is selected from the group consisting of aliphatic, aromatic and cycloaliphatic hydrocarbon radicals having from 1 to 14 carbon atoms, and said R and R' being free of aliphatic unsaturation.

2. The method for polymerizing propylene oxide which comprises, under non-oxidizing conditions, mixing together propylene oxide, $H_2S$ and diethyl zinc in an inert solvent for said propylene oxide, said $H_2S$ and diethyl zinc being used in a total amount of from about 0.01 to 10 mols based on 100 mols total of said propylene oxide, the ratio of said $H_2S$ to said diethyl zinc being from about 0.05:1 to 2.5:1 moles, and polymerizing said propylene oxide at a temperature of from about 40 to 150° C.

3. The method for polymerizing a copolymer of propylene oxide and allyl glycidyl ether which comprises, under non-oxidizing conditions, mixing together propylene oxide, allyl glycidyl ether, $H_2S$ and diethyl zinc in an inert solvent for said propylene oxide and allyl glycidyl ether, said $H_2S$ and diethyl zinc being used in a total amount of from about 0.01 to 10 moles based on 100 mols total of said propylene oxide and allyl glycidyl ether, the ratio of said $H_2S$ to said diethyl zinc being from about 0.05:1 to 2.5:1 mols, and copolymerizing said propylene oxide and allyl glycidyl ether at a temperature of from about 40 to 150° C., said propylene oxide being used in an amount of from about 95 to 98.5 mols to from 5 to 1.5 mols of said allyl glycidyl ether.

4. The method according to claim 1 in which during said polymerization there is present in admixture with said oxide and said catalyst additionally an inert solvent for said cyclic oxide, and (I) has the formula RAH.

5. The method according to claim 4 where said cyclic oxide is selected from the group consisting of cyclic oxides having one carbon-to-carbon aliphatic double bond and cyclic oxides free of carbon-to-carbon aliphatic double bonds, and where the total amount of (I) and (II) mixed with said cyclic oxide is from about 0.01 to 10 moles based on 100 moles total of said cyclic oxide.

6. The method according to claim 5 in which said cyclic oxide has one epoxy group and where the ratio of (I) to (II) is from about 0.05:1 to 2.5:1 moles.

7. The method according to claim 6 in which the polymerization is conducted at a temperature of from about 40 to 150° C.

8. The method according to claim 7 where A is sulfur and where B is zinc.

9. The method according to claim 8 where said cyclic oxide is propylene oxide.

10. The method according to claim 8 where said cyclic oxide is a mixture comprising about from 95 to 98.5 mol percent propylene oxide and from 5 to 1.5 mol percent allyl glycidyl ether.

11. The method according to claim 8 where (I) is ethyl mercaptan and where (II) is diethyl zinc.

12. The method according to claim 8 where (I) is butanethiol and where (II) is diethyl zinc.

13. The method according to claim 8 where (I) is thiophenol and where (II) is diethyl zinc.

(References on following page)

References Cited by the Examiner
UNITED STATES PATENTS

| | | | |
|---|---|---|---|
| 2,515,129 | 8/1945 | Lieber et al. | 260—448 |
| 2,843,577 | 7/1958 | Friedlander et al. | 260—94.9 |
| 2,870,100 | 1/1959 | Stewart et al. | 260—2 |
| 2,870,101 | 1/1959 | Stewart | 260—2 |
| 2,915,541 | 12/1959 | Ziegler et al. | 260—429 |
| 2,953,586 | 9/1960 | Hafner et al. | 260—429 |
| 2,954,404 | 9/1960 | Laufer | 260—448 |
| 3,031,439 | 4/1962 | Bailey | 260—2 |

OTHER REFERENCES

Furukawa et al.: Makromol. Chem., 32 (1959).

Conant, J. B., and Blatt, A. H.: "Organic Compounds" The MacMillan Co., New York (1959).

Reid, E. E.: "Organic Chemistry of Bivalent Sulfur," Chemical Publishing Co., New York, 1958.

JOSEPH L. SCHOFER, *Primary Examiner*.

H. N. BURSTEIN, M. LIEBERMAN, JAMES A. SEIDLECK, *Examiners*.